United States Patent [19]

Downing

[11] Patent Number: 5,339,574
[45] Date of Patent: Aug. 23, 1994

[54] INFLATABLE MOLD CONSTRUCTION

[76] Inventor: Brian B. Downing, 1522 Anita, Bossier City, La. 71112

[21] Appl. No.: 932,682

[22] Filed: Aug. 20, 1992

[51] Int. Cl.$^5$ .................. E04B 1/34; E04G 11/04; B28B 7/32
[52] U.S. Cl. .................. 52/2.15; 52/2.17; 264/314
[58] Field of Search .......... 52/2.15, 2.17, 2.19, 52/2.22, 2.23; 264/32, 45.2, 314, 315

[56] References Cited

U.S. PATENT DOCUMENTS

| | | | |
|---|---|---|---|
| 3,110,552 | 11/1963 | Voelker . | |
| 3,329,750 | 7/1967 | Growald . | |
| 3,909,992 | 10/1975 | Stachiw | 52/2.15 |
| 4,016,702 | 4/1977 | Nakada et al. | 52/2.15 |
| 4,021,972 | 5/1977 | Choate et al. | 52/2.15 |
| 4,304,084 | 12/1981 | Moreland | 52/2.15 |
| 4,746,471 | 5/1988 | Hale | 52/2.15 |
| 4,825,599 | 5/1989 | Swann, Jr. . | |

Primary Examiner—Neill R. Wilson
Attorney, Agent, or Firm—Richard C. Litman

[57] ABSTRACT

The present invention pertains to the construction of modular structures used as a building blocks to create an habitation or integrated structures which form habitations. In both cases flexible molds are injected with mold materials to form the final structure created. An outer cavity of the mold is first inflated to create either a finalized shape of the structure or a partial shape for the structure. If internal constraints of the innermost cavity are already included, a finalized structural shape is obtained. If internal constraints for the innermost cavity have to be added, the final shaped is obtain after those constraints are placed within the innermost cavity.

9 Claims, 2 Drawing Sheets

INFLATABLE MOLD CONSTRUCTION

BACKGROUND OF THE INVENTION

1. Field of the Invention

The present invention relates to inflatable flexible molds. More particularly, the present invention relates to inflatable flexible molds and mold components, and the method of making the same, which can combined to build various structures, for example, a space lab.

2. Description of the Prior Art

In the prior art, flexible molds having multiple layers of flexible material defining at least one inner cavity therebetween are known. The molds can have fluid mold material injected between two of the layers to fill one of the cavities. If a plurality of cavities exist within the mold then those cavities could also be filled with fluid mold materials or gasses. Once the fluid mold material is injected into at least one of the cavities, the flexible mold assumes its final shape. When the mold material hardens, a solid structure in the final shape of the mold is obtained. Various methods of forming the final solid structure using a multiple of flexible molds is shown in the prior art.

U.S. Pat. No. 4,825,599 issued May 2, 1989 to Swann, Jr. discloses a flexible mold which forms a structure to be used in space when inflated after being placed into space. Several types of foam material are used as mold materials, each one being injected into one of the cavities of the mold. The inner portion of the mold is filled with gas or liquid to hold the final shape of the structure, in this case spherical, as the foam hardens.

U.S. Pat. No. 3,110,552 issued Nov. 12, 1963 to Voelker discloses a flexible mold which forms a structure to be used in space when inflated after being placed into space. Voelker discloses that the final shape of the structure may be a toroid. The mold has an inner and outer layer in which foam is injected therebetween via an entry port. If desired, a vent may be provided at the far end of the cavity between the inner and outer layers to permit the escape of gases. Between the inner and outer layers, fibers or webs may be attached so that the structure maintains the desired final shape before the foam hardens. Also, the inner layer may be inflated to form an inner cavity and to offset the pressure generated by the foam between the inner and outer layers.

U.S. Pat. No. 3,329,750 issued Jul. 4, 1967 to Growald discloses a flexible mold for constructing a building structure. Growald uses a multi-layered flexible mold in which one cavity is inflated to extend the structure to its desired shaped. Afterwards, foam is injected into the other cavity. Once the injected foam has hardened, the inflated cavity may be deflated and then filled with foam as well.

None of the above inventions and patents, taken either singly or in combination, is seen to describe the instant invention as claimed.

SUMMARY OF THE INVENTION

The present invention utilizes flexible inflatable mold materials with at least two layers of materials to form at least one airtight cavity therebetween. In a first embodiment, an inflatable mold is used to create a habitation. The habitation could be used in space. The mold preferably has at least three layers of mold material forming two airtight cavities around an innermost cavity. The mold may be in the shape of a cylinder.

A first outermost cavity of the mold is blown up with pressurized gas. An innermost flexible wall layer surround an innermost cavity. Constraints between the middle layer and outermost layer are provided in order to expand the middle layer when the outermost cavity is filled with pressurized gas. Constraints between the middle layer and innermost layer expand the innermost cavity. A hatch opening at one end of the cylinder allows access to the inner most cavity. Means to attach constraints inside this inner most cavity are provided on the inner wall of the third layer of material so that further constraints can be added once the mold is blown up. These constraints could be place within the inner most cavity, which forms the habitation, before or after the mold is blown up.

Once the mold is blown up and a final shape is achieved, fluid mold material is injected into the middle cavity and is allowed to harden, i.e., with time. Afterwards, the inflated cavity may then be deflated and mold material may be injected therein to form an outermost hull layer within the outermost cavity. Clearly, a plurality of layers may be used in the habitation.

In a second embodiment, modular components which may be combined to form a desired final structure are formed in approximately the same manner as the habitation. Inner constraints are placed within the inner most cavity and between each concentric layer of material. Pressurized gas is injected into one of the cavities except the inner cavity. In this manner the final desired shape of the inner cavity is obtained. Mold material is then injected into the inner cavity of the mold. Once the mold material hardens, the other cavities may also be filled with mold material including the cavity which was inflated. The inflated cavity would have to be deflated before the mold material could be added therein.

Accordingly, it is a principal object of the invention to provide flexible molds which may be utilized in space to form habitations suitable for humans.

It is another object of the invention to provide internal constraints within the flexible molds which may be formed therein or added thereto so as to obtain a desire shape for the final product.

It is a further object of the invention to provide molds for forming modular components of a final structure, in which the modular components may be connected with other like or dissimilar components.

It is still a further object of the present invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
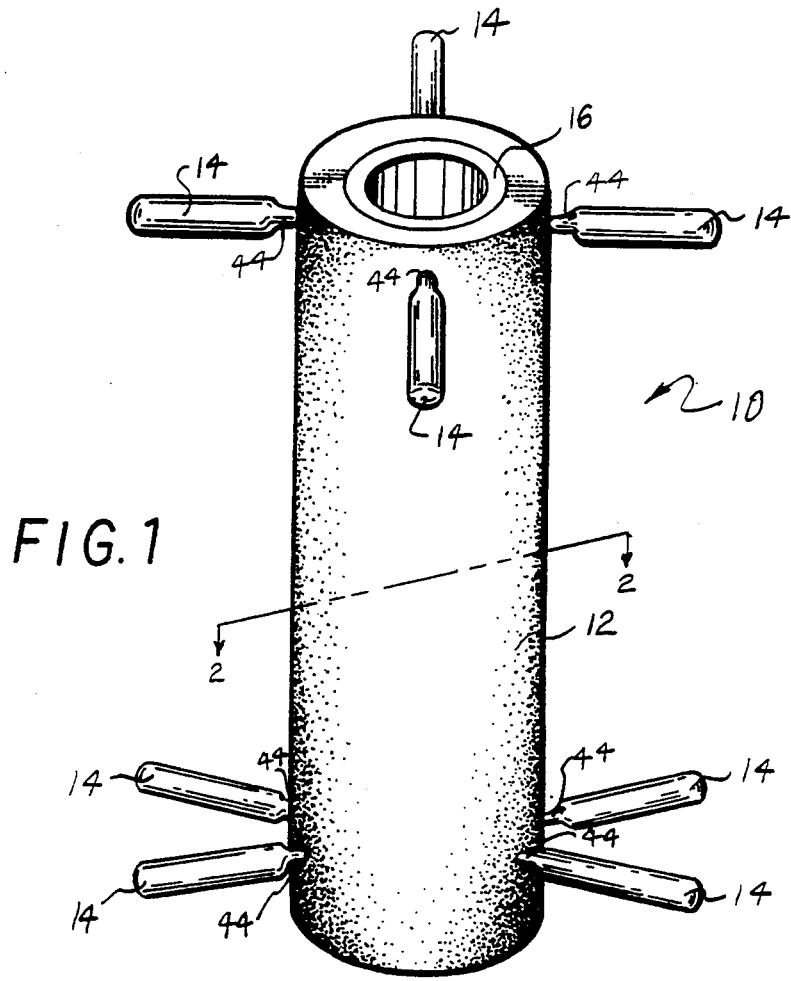
FIG. 1 is elevated perspective view of a first embodiment of the present invention.

As shown in FIG. 1, a flexible mold for a habitation intended to be used in space may transported into space in a collapsed form. Once in space, one of the cavities may be inflated so that the mold assumes an expanded shape. In the embodiment of FIG. 1, a cylindrically shaped habitation 10 with an outer most wall 12 is disclosed having an airlock hatch opening 16 at one end thereof. Such an airlock opening is known in the prior art as disclosed by Swann, Jr. made of record and incorporated herein by reference.

Figure 2:
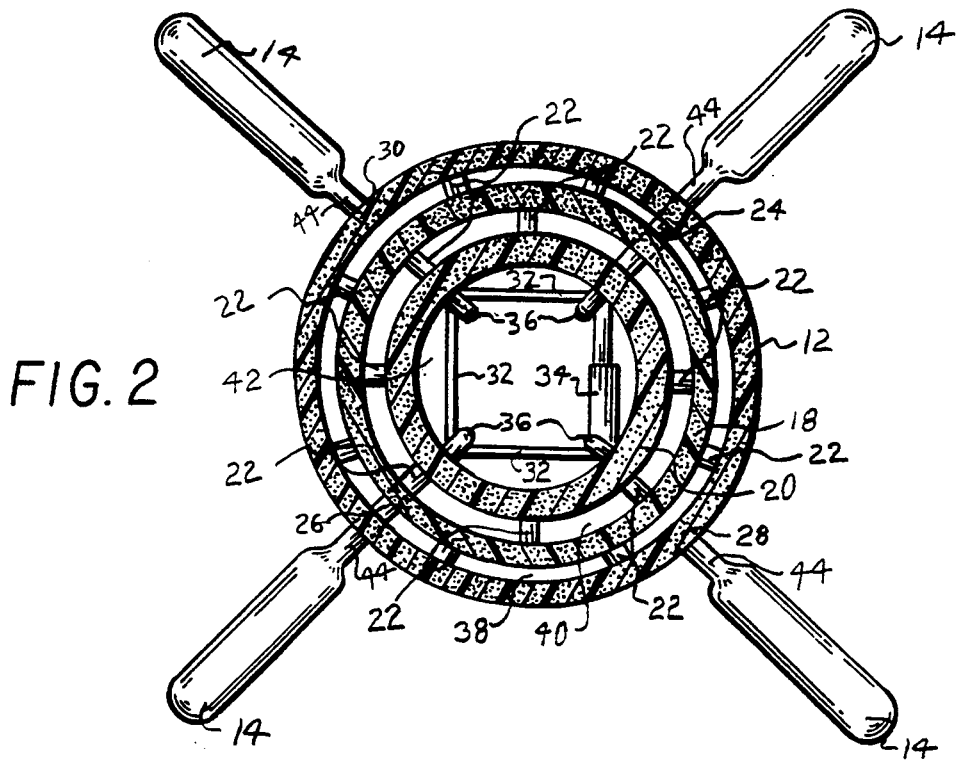
FIG. 2 is a cross-sectional view of the first embodiment along lines 2—2 of FIG. 1.

Located on the outer wall 12 are sealable hose connections to which pressurized tanks 14 containing either gasses or composite mold materials are connected. As shown in FIG. 2, an innermost cavity 42 is surrounded by an innermost flexible wall layer 20. An outer flexible wall layer 18 surrounds the innermost wall layer 20. The outermost wall layer 12 surrounds both the innermost wall layer 20 and the outer flexible wall layer 18. Each of the pressurized tanks 14 are used to fill the cavities between two successive flexible wall layers with either gas or composite mold material In the preferred embodiment, the outermost cavity 38 is first filled with air using bottles 14 connected opposite each other to the outermost cavity 38 via hose connections 28 and 30. Valve connections 44 on each of the pressurized tanks 14 control the inlet of the pressurized material into the mold. Constraints 22 are attached between the middle flexible wall layer 18 and the outer flexible wall layer 12 so as to fix the distance between the inner and middle wall layers. Constraints 22 are also placed between the middle flexible wall layer 18 and the innermost flexible wall layer 20. The constraints 22 may be flexible webs attached to adjacent flexible wall layers or they may be rigid connections. In either case, the inner cavity is expanded along as the outermost cavity is filled with pressurized gas.

Once the pressurized gas is injected into the outermost cavity, innermost restraints can be placed within the cavity to give the middle cavity its final desired shape. Innermost restraint fasteners 36 are used to attach webs 32 or expandable rods 34 so as to form the desired inner shape for the habitation. The expandable rods may use the same principle of operation as any conventional rod which expands, such as air or fluid shocks used in automobiles. With the final desired shape of the mold being achieved by the pressurized outer cavity 38 pulling on the restraints 22 between the middle flexible wall layer 18 and the outermost wall layer 12 as well as the restraints 22 located between the middle flexible wall layer 18 and the innermost flexible wall layer 20 constrained by the constraints 32 and 34, fluid mold material is injected into the middle cavity 40 and is allowed to harden. Hose connections 24 and 28 are used to inject the fluid mold material from the tanks 14 connected thereto into the middle cavity 40. Two of the tanks at opposite ends of each other near the hatch opening 16 may also be used to inject fluid mold material into the middle cavity 40. The reason for using tanks opposite each other is so that the thrust from the two tank cancel each other when the valves 44 are adjusted to allow the same fluid rate of mold material into the cavity. In this way, no linear or angular acceleration of the mold occurs in space.

Once the mold within the middle cavity has hardened, the inner hull of the habitation is formed. The inflated cavity is then deflated by detaching the pressurized tanks from the hose connections 28 and 30. The gasses escaping out the hose connection 30 into space would cancel the thrust of the gasses escaping out the hose connection 28. The hose connection are sealed once all the gas within the outermost cavity has been evacuated into space. Other tanks 14, containing fluid mold material may then be connected to the hose connections 28 and 30. These tanks 14 can then be used to fill the outer cavity 38 with fluid mold material in the same way as the middle cavity was filled. Two of the tanks 14 near the hatch opening 16 can also be used to fill the outer cavity 38.

Figure 3:
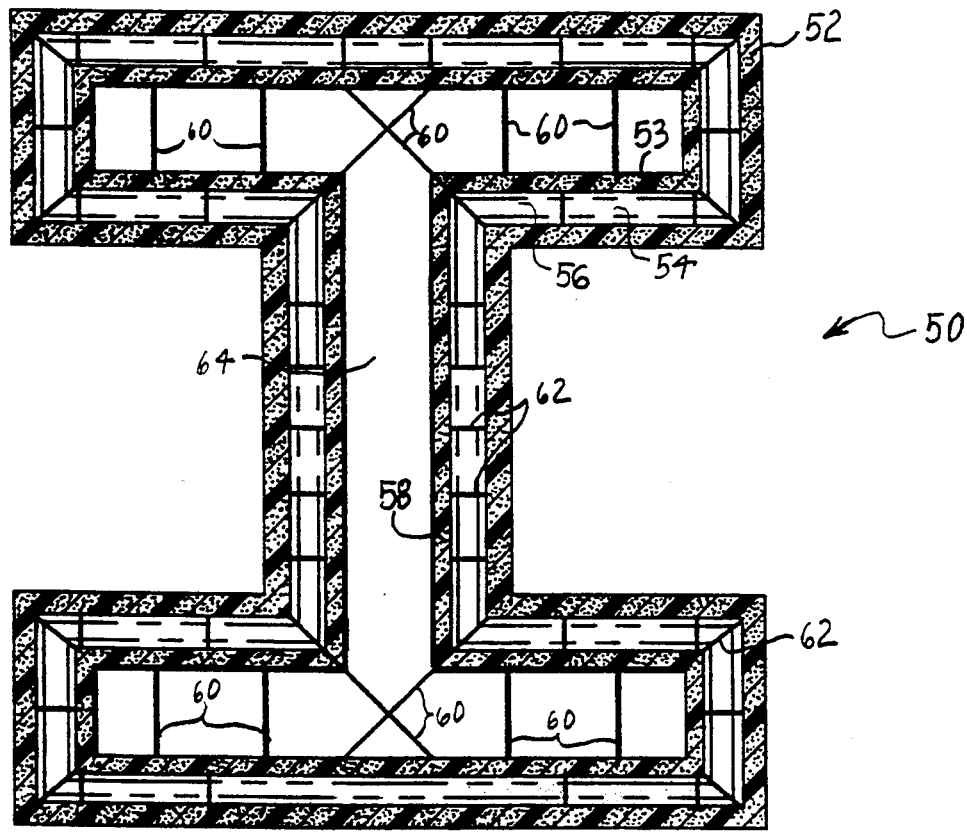
FIG. 3 is a cross-sectional view of a second embodiment of the present invention.

As shown in FIG. 3, a modular component, such as an I-beam, can be constructed using a flexible mold having a plurality of cavities therein. In FIG. 3, an outer flexible wall layer 52 surrounds and completely encloses an inner flexible wall layer 58. A plurality of walls, such as wall 54, may be included between outer wall 52 and inner wall 58. In the preferred embodiment, only the inner wall 58 and the outer wall 52 are used.

For the forming of a modular component having a solid form, i.e., an I-beam, the outermost cavity 56 between the inner wall 58 and the outer wall 52 is inflated with pressurized gas in the same manner as discussed in the first embodiment. Internal constraints 62, which may be flexible webs or some type of rigid connection, are connected between the inner and outer walls in key locations to prevent excessive bulging of the outer wall 52, while also shaping the innermost cavity 64. Internal constraints 60 are used inside the innermost cavity 64 to help shape key locations of the innermost cavity 64, such as at sharp corners or to prevent excessive bulging of flat surface areas.

Once the outermost cavity 56 is inflated, the final desired shape of the mold is achieved and the inner cavity 64 is injected with fluid mold material in the same manner as described above in conjunction with the first embodiment. Once the fluid mold material hardens, the inflated cavity is deflated and fluid mold material is injected therein.

Figure 4:
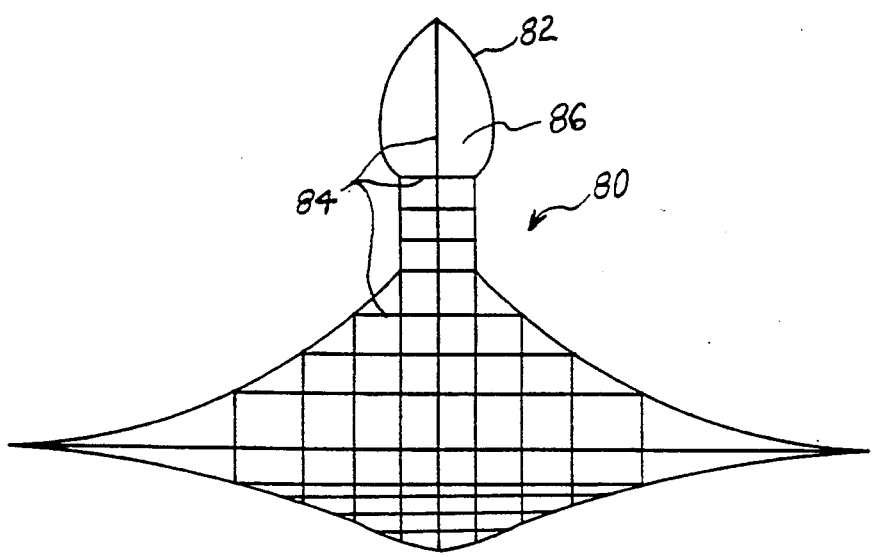
FIG. 4 is a diagrammatic cross-sectional view of a third embodiment of the present invention.

As an example of how internal constraints may be used, FIG. 4 illustrates a diagrammatic cross section for a flexible mold 80 with outer walls and cavities 82 which are inflated and injected with mold material as discussed with the embodiments of FIGS. 1-3 to form the innermost cavity 86. The innermost constraints 84 are connected to force the inner cavity 86 to form the desired final shape.

It is to be understood that the present invention is not limited to the sole embodiment described above, but encompasses any and all embodiments within the scope of the following claims.

I claim:

1. A flexible inflatable multi-walled mold comprising:
    an innermost flexible wall layer surrounding an innermost cavity of said mold;
    at least one outer cavity defined between each of said at least one outer flexible wall layer;
    means for injecting pressurized gas into one of said at least one outer cavity so as to provide an expanded shape for said mold; and
    means for injecting mold material into said innermost cavity once said one of said at least one outer cavity has pressurized gas injected therein.

2. A mold as claimed in claim 1, further comprising:

means for deflating said one of at least one outer cavity into which pressurized gas was injected therein; and, means for injecting mold material into each of said at least one outer cavity after said one of said at least one outer cavity into which pressurized gas was injected is deflated.

3. A mold as claimed in claim 2, further comprising:

innermost restraint means located within said innermost cavity, said innermost restraint means including a plurality of flexible webs, each having two opposite ends, wherein both of said opposite ends of each of said plurality of flexible webs of said innermost restraint means are attached to said innermost flexible wall layer; and, outer restraint means located within each of said at least one outer cavity, said outer restraint means including a plurality of flexible webs, each having two opposite ends, wherein both of said opposite ends of each of said plurality of flexible webs of said outer restrain means are attached between opposing wall layers.

4. A mold as claimed in claim 3, further comprising:

innermost restraint means located within said innermost cavity, said innermost restraint means including a plurality of rigid connections, each having two opposite ends, wherein both of said opposite ends of each of said plurality of rigid connections are attached to said innermost flexible wall layer; and, outer restraint means located within each of said at least one outer cavity, said outer restraint means including a plurality of rigid connectors, each having two opposite ends, wherein both of said opposite ends of each of said plurality of rigid connectors are attached between opposing wall layers.

5. A flexible inflatable multi-walled mold comprising:

an innermost flexible wall layer surrounding an innermost cavity of said mold;

a plurality of innermost restraint fasteners located within said innermost cavity attached to said innermost flexible wall layer;

a plurality of outer flexible wall layers surrounding said innermost flexible wall;

a plurality of outer cavities;

each of said plurality of outer cavities being defined between each two of said plurality of outer flexible wall layers;

outer restraint means located within each of said plurality of outer cavities, said outer restraint means including a plurality of connections between opposing wall layers within each of said plurality of outer cavities; and means for injecting pressurized gas into one of said plurality of outer cavities so as to provide an expanded shape for said mold.

6. A mold as claimed in claim 5, wherein said outer restraint means includes flexible webs.

7. A mold as claimed in claim 5, wherein said outer restraint means includes rigid connections.

8. A mold as claimed in claim 5, further comprising:

an opening through said mold to said inner cavity for allowing access to said innermost cavity when said one of said at least one outer cavity has pressurized gas injected therein so as to provide an expanded shape for said mold;

innermost restraint means including a plurality of attachments, each of said plurality of attachments having two ends, wherein each end of each of said plurality of attachments is connectable to any of said plurality of innermost restraint fasteners to provide a final desired shape of said mold;

means for injecting mold material into each of said at least one outer cavity which were not inflated once a final desired shape of said mole has been obtained;

means for deflating said one of at least one outer cavity into which pressurized gas was injected therein; and, means for injecting mold material into said at least one outer cavity into which pressurized gas was injected therein after being deflated.

9. A mold as claimed in claim 8, wherein said plurality of attachments may selectively include any of a plurality of webs and a plurality of rigid telescopic bars.

* * * * *